United States Patent
Eugene

(10) Patent No.: US 8,798,781 B2
(45) Date of Patent: Aug. 5, 2014

(54) METHOD AND SYSTEM FOR CONVERTING AN IMAGE TO A COLOR-REDUCED IMAGE MAPPED TO EMBROIDERY THREAD COLORS

(75) Inventor: Hsu Eugene, Somerville, MA (US)

(73) Assignee: VISTAPRINT SCHWEIZ GmbH, Winterthur (CH)

(*) Notice: Subject to any disclaimer, the term of this patent is extended or adjusted under 35 U.S.C. 154(b) by 277 days.

(21) Appl. No.: 13/022,390

(22) Filed: Feb. 7, 2011

(65) Prior Publication Data

US 2012/0203371 A1 Aug. 9, 2012

(51) Int. Cl.
*D05C 5/02* (2006.01)

(52) U.S. Cl.
USPC .................. 700/138; 112/470.01; 112/475.19

(58) Field of Classification Search
USPC ................ 700/136–138; 112/470.01, 470.04, 112/475.18, 475.19
See application file for complete search history.

(56) References Cited

U.S. PATENT DOCUMENTS

| | | | |
|---|---|---|---|
| 4,998,489 A | 3/1991 | Hisatake et al. | |
| 5,386,789 A * | 2/1995 | Futamura et al. | 112/470.04 |
| 5,791,270 A | 8/1998 | Mori | |
| 5,794,553 A * | 8/1998 | Futamura | 112/475.19 |
| 5,803,000 A | 9/1998 | Morita | |
| 5,839,380 A * | 11/1998 | Muto | 112/475.19 |
| 5,911,182 A | 6/1999 | Uyama et al. | |
| 6,324,441 B1 * | 11/2001 | Yamada | 700/138 |
| 6,397,120 B1 | 5/2002 | Goldman | |
| 6,590,999 B1 | 7/2003 | Comaniciu et al. | |
| 6,600,966 B1 | 7/2003 | Bailie | |
| 6,804,573 B2 | 10/2004 | Goldman | |
| 6,836,695 B1 | 12/2004 | Goldman | |
| 6,947,808 B2 | 9/2005 | Goldman | |
| 6,952,626 B1 * | 10/2005 | Taguchi et al. | 700/138 |
| 7,016,756 B2 | 3/2006 | Goldman | |
| 7,016,757 B2 | 3/2006 | Goldman | |
| 7,587,256 B2 | 9/2009 | Goldman | |
| 8,335,584 B2 * | 12/2012 | Yamada | 700/138 |
| 2004/0243275 A1 * | 12/2004 | Goldman | 700/138 |
| 2010/0106283 A1 * | 4/2010 | Harvill et al. | 700/138 |
| 2010/0305744 A1 * | 12/2010 | Yamada | 700/138 |

* cited by examiner

*Primary Examiner* — Nathan Durham
(74) *Attorney, Agent, or Firm* — Jessica Costa

(57) ABSTRACT

Methods and systems are presented for converting an image to a color-reduced image suitable for embroidery and having colors mapped only to available embroidery thread colors. Pixel color values in the image are snapped to a nearest color in a predetermined reduced set of colors that correspond to embroidery thread colors. The image is then color-reduced by iteratively identifying possible pairs of colors in the color-reduced image and merging at least one identified color pair based on color similarity and edge characteristics until the total number of colors in the color-reduced image is not greater than the predetermined maximum color count.

31 Claims, 13 Drawing Sheets

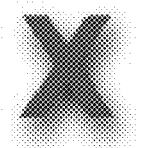
FIG. 2A          FIG. 2B
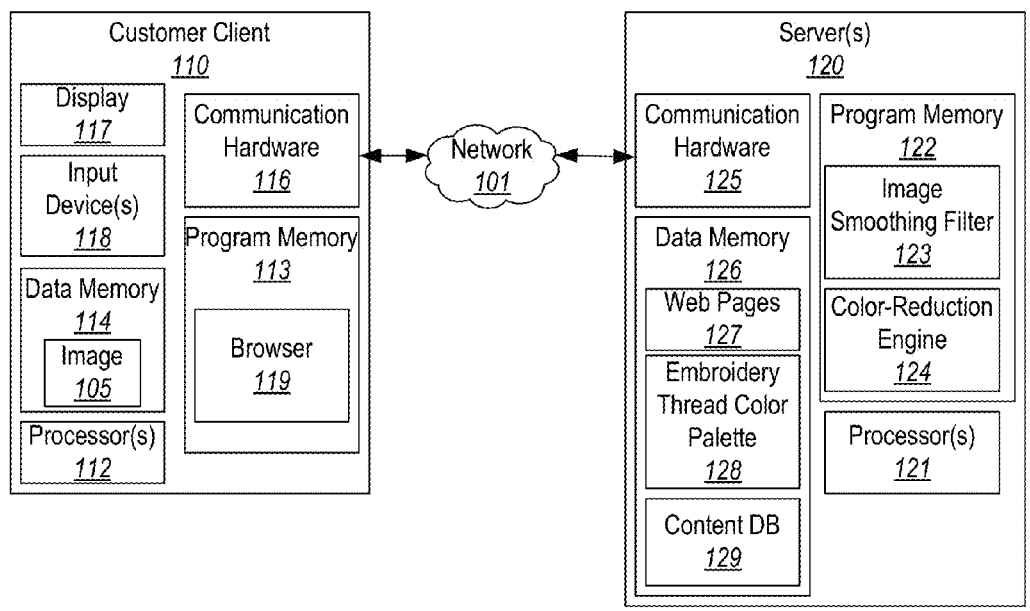
FIG. 3

FIG. 5
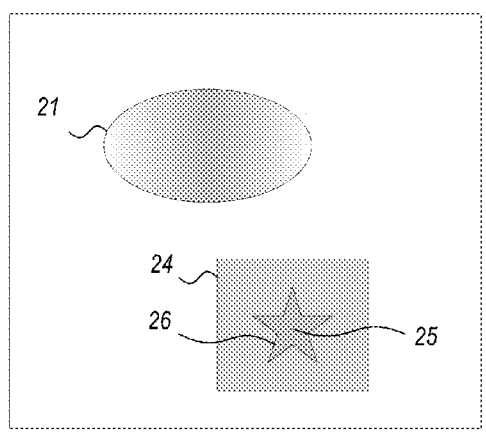
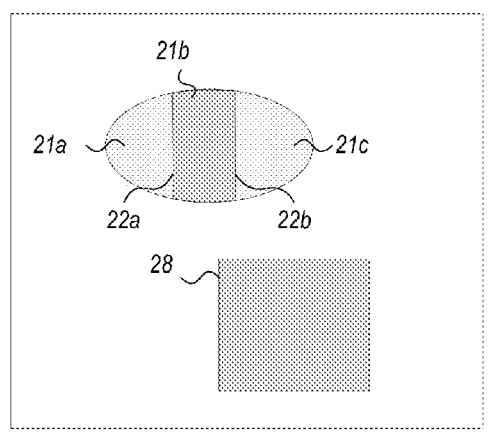
FIG. 6A    FIG. 6B

METHOD AND SYSTEM FOR CONVERTING AN IMAGE TO A COLOR-REDUCED IMAGE MAPPED TO EMBROIDERY THREAD COLORS

BACKGROUND OF THE INVENTION

The present invention relates generally to embroidery and more particularly to methods and systems for converting an image to a color-reduced image having colors corresponding to a set of available embroidery thread colors.

Embroidery is the art of applying decorative threaded designs to fabric or textiles. In machine embroidery, embroidery designs are stitched with an automated embroidery machine that holds a limited number of thread spools and stitches a design using a number of thread colors as limited by the number of thread spools. Embroidery designs are digitized into a sequence of embroidery primitives with embroidery software, and then converted to individual stitches using a stitch engine. Methods, systems, and techniques for computer-assisted embroidery are described in U.S. Pat. No. 6,836,695 to Goldman, U.S. Pat. No. 7,016,756 to Goldman, U.S. Pat. No. 6,947,808 to Goldman, U.S. Pat. No. 7,016,757 to Goldman, U.S. Pat. No. 7,587,256 to Goldman, U.S. Pat. No. 6,804,573 to Goldman, U.S. Pat. No. 6,397,120 to Goldman, U.S. Patent Application Publication No. US 2010-0191364 A1 to Goldman, U.S. Patent Application Publication No. US 2007-0118245 A1 to Goldman et al., U.S. Patent Application Publication No. US 2010-0017011 A1 to Goldman et al., U.S. Patent Application Publication No. US 2008-0079727 A1 to Goldman et al., U.S. patent application Ser. No. 12/969,359 to Goldman et al., U.S. patent application Ser. No. 12/911,521 to Hsu et al., U.S. patent application Ser. No. 13/017,945 to Nykyforov, and U.S. patent application Ser. No. 13/019,222 to Benitez et al., each of which is incorporated by reference herein for all that they teach.

Embroidered products may be viewed and purchased at various websites accessible through the Internet. Most embroidery vendors offer a number of different embroidery designs that have been previously prepared by an embroidery designer to be suitable for embroidery. At least one vendor allows a user to upload an image and have it converted to an embroidery design. U.S. Patent Application Publication US2010/010,6283 A1, hereby incorporated by reference herein for all that it teaches, describes an embroidery system and method in which a consumer can provide a design, such as images or text, have it converted into a digitized image and then used to generate customized embroidery that can be placed onto a product.

Not all images are suitable for embroidery. Images best suited to embroidery are those containing only a few colors and which can be represented using simple shapes of solid color. Images with too many colors or which contain complicated or small detail do not translate well to embroidery. Furthermore, since an image may contain millions of different colors, the number of colors must be reduced to a small set of colors which correspond to a set of available thread colors. Furthermore, since a given embroidery machine may only allow stitching from a limited number of thread spools, the number of colors in the image may need to be further reduced to a number equal to or less than the limited number of thread spools held by the particular embroidery machine.

Color reduction of an image is essentially a form of down-sampling the image to a few discrete colors, and as known by those in the art, downsampling of an image can change the appearance of the image, and depending on the image, can negatively affect the aesthetics of the image. For example, new edges may appear in the color-reduced image which appeared as a gradual transition of color in the original image. Conversely, edges which appear in the original image may disappear as original colors are mapped to the same discrete color in the color-reduced image.

While color-reduction processes exist, known color-reduction processes reduce the colors to the dominant colors in the image (i.e., those colors covering the most pixels) and without regard to actual thread colors used in embroidery. Thus, important but small detail of some images may become completely lost after color-reduction takes place. Furthermore, there is no guarantee that the resulting color-reduced image contains colors that match available thread colors. Color reduction is performed without regard to the end application—conversion of the image to an embroidery design that will be embroidered using actual embroidery thread colors.

In the past, the judgment of whether or not an image lends itself well to embroidery and the mapping of image colors to embroidery thread colors has been left to humans with a trained eye for the types of images that will look good when translated into an embroidered image. However, with the advent of online vendors offering embroidered products, it would be desirable to allow a user to upload an image, have it converted to an embroidery design, and order a product embroidered with the design. To avoid customer disappointment, it would further be desirable to automatically color-reduce the uploaded image, and present to the user one or more proposed color-reduced embroidery designs from which the user can select so that the user will understand how the image will appear when embroidered prior to ordering the product.

SUMMARY OF THE INVENTION

Methods and systems are presented for converting an image to a color-reduced image having colors corresponding to a set of available embroidery thread colors.

In an embodiment, a method for converting an image to a color-reduced image includes receiving an image comprising a plurality of pixels, generating a color-reduced image by snapping each pixel in the image to a nearest color in a predetermined reduced set of colors, and if the total number of colors in the color-reduced image is greater than a predetermined maximum color count, iteratively identifying possible pairs of colors in the color-reduced image and merging at least one identified color pair based on color similarity and edge characteristics until the total number of colors in the color-reduced image is not greater than the predetermined maximum color count.

In another embodiment, non-transitory computer readable storage tangibly embodies program instructions instructing processor(s) to convert an image to a color-reduced image. The program instructions include instructions for receiving an image comprising a plurality of pixels, generating a color-reduced image by snapping each pixel in the image to a nearest color in a predetermined reduced set of colors, and if the total number of colors in the color-reduced image is greater than a predetermined maximum color count, iteratively identifying possible pairs of colors in the color-reduced image and merging at least one identified color pair based on color similarity and edge characteristics until the total number of colors in the color-reduced image is not greater than the predetermined maximum color count.

In yet another embodiment, an apparatus for converting an image to a color-reduced image includes computer readable memory storing an image comprising a plurality of pixels, and one or more processors configured to generate a color-reduced image by snapping each pixel in the image to a nearest color in a predetermined reduced set of colors, and if the one or more processors determine that the total number of colors in the color-reduced image is greater than a predetermined maximum color count, to iteratively identify possible pairs of colors in the color-reduced image and to merge at least one identified color pair based on color similarity and edge characteristics until the total number of colors in the color-reduced image is not greater than the predetermined maximum color count.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein:

FIGS. 2A and 2B respectively illustrate an example full-color image and a corresponding color-reduced image;

FIG. 3 is a block diagram of an exemplary system implementing an embodiment of the invention;

FIG. 5 is a pixel map of a digital image;

FIG. 6A is an example original image and FIG. 6B is a corresponding color-reduced image of the original image of FIG. 6A, illustrating introduction of new edges and disappearance of original edges resulting from color-reduction;

DETAILED DESCRIPTION

Figure 1:
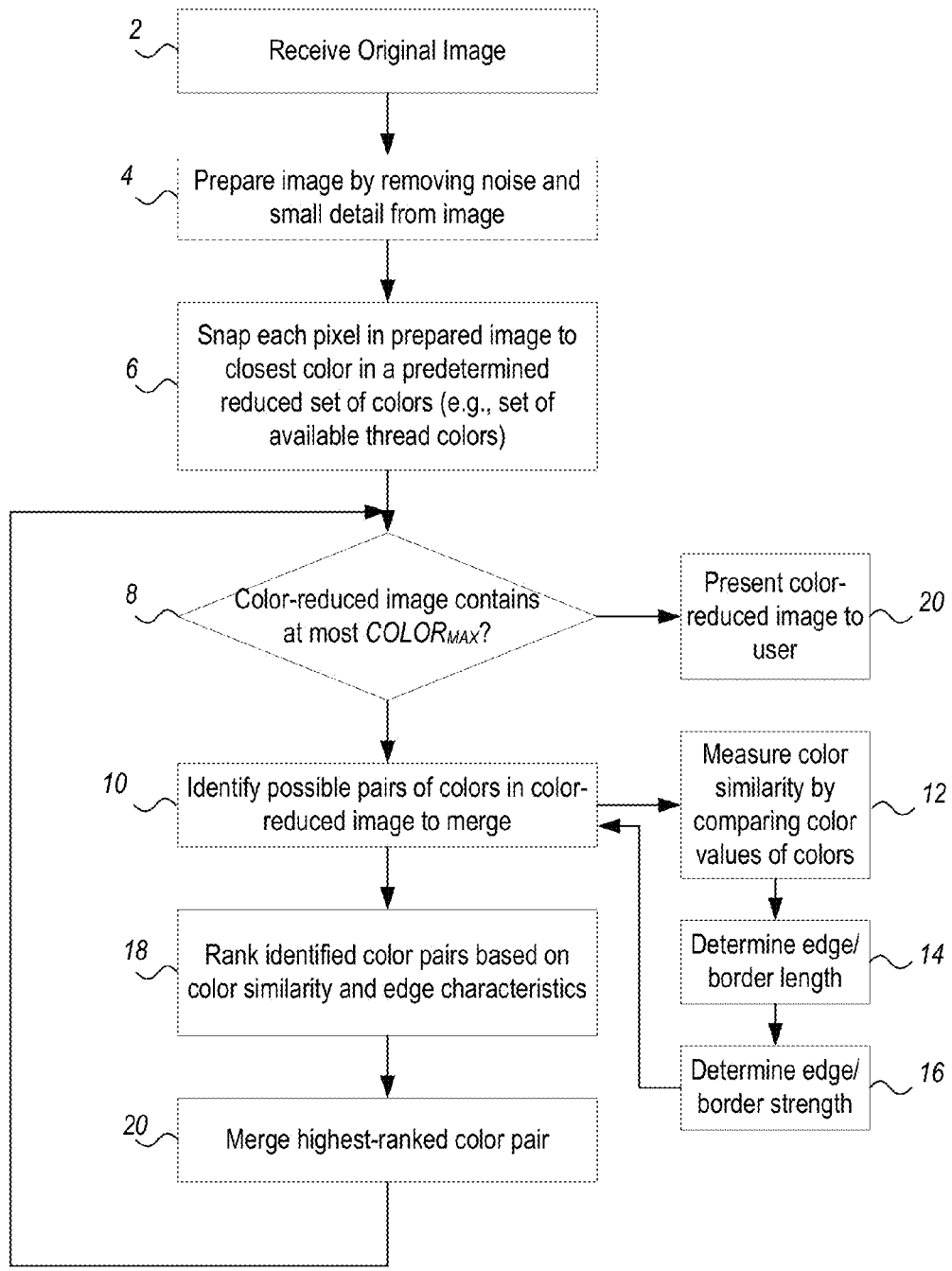
FIG. 1 is a flowchart illustrating an exemplary method in accordance with an embodiment of the invention.

FIG. 1 shows a flowchart of an exemplary method for converting an image to a color-reduced image for use in converting an image to an embroidery design. As illustrated, the method includes receiving an image intended to be converted to an embroidery design (step 2). In an embodiment, the image is submitted by an embroidery designer generating embroidery designs from images. In another embodiment, the image is submitted by a customer of a vendor selling embroidered products. In an embodiment, the image is uploaded by the designer or customer to a server which shall itself or shall cause one or more other computers to perform color reduction of the image to a limited palette of embroidery thread colors.

In an embodiment, the image is first filtered (step 4) to remove noise and other unembroiderable small detail. The filter is preferably an edge-preserving smoothing filter to reduce the amount of noise and detail in the image. In an embodiment, the filter comprises a mean-shift algorithm which smoothes the image to continuous color tones.

Given the image (from step 2), or preferably the filtered image (from step 4), an initial color-reduced image is generated by snapping each pixel in the image to a nearest color in a predetermined reduced set of colors (step 6). In an embodiment, the predetermined reduced set of colors corresponds to the set of available embroidery thread colors. In an alternative embodiment, the predetermined reduced set of colors does not correspond directly to the embroidery thread colors but each of the reduced set of colors is mapped (presently or at a later time) to a corresponding embroidery thread color, and the snapping step occurs again after the image is reduced to the maximum number of colors.

As discussed in the background section, an embroidery machine typically can stitch only a limited number of thread colors in any embroidery job. Thread spools are mounted on individual spindles in the machine, and each mounted thread spool is considered a thread source by the machine. Stitches in a design can be stitched by the embroidery machine from any and all of the thread sources. Even in larger industrial embroidery machines, the embroidery machine will typically allow stitching from a limited number of thread sources for any given embroidery job. For example, an industrial machine may allow a maximum of 16 thread colors in a given embroidery job. The number of colors in an embroidery job should thus be limited to the maximum number of thread sources specified by the machine. In some applications, the number of colors may be further reduced for reasons such as a limited availability of thread colors, the vendor requires even simpler designs, etc. In any case, it is desired to reduce the image to a predetermined maximum number of colors, $COLORS_{MAX}$, which can correspond to the maximum number of thread sources allowed by the embroidery machine, or even fewer colors.

Although it is desirable for the aforementioned reasons to reduce the number of colors in the design at least to the predetermined maximum number of colors, $COLORS_{MAX}$, or fewer, the number of available thread colors may certainly exceed this number. For example, in an embodiment, there may be 64 available thread colors, yet the machine may only allow 16 colors to be stitched in any given design. Thus, the maximum number of colors, $COLORS_{MAX}$, in the design must be limited to 16 colors or fewer. Thus, if (as determined in step 8) after the initial color mapping is completed (in step 6) the color-reduced image contains more than the predetermined maximum number of colors, $COLORS_{MAX}$, then some of the colors in the color-reduced image must be merged to further reduce the number of colors.

If the original image generally contains only large regions of solid color, then it is possible that the image need not be further processed. However, in cases where the number of colors exceeds the predetermined maximum number of colors, $COLORS_{MAX}$, then color merging is performed as follows:

First, the color-reduced image is processed to identify possible pairs of colors (i.e., color pairs) as candidates for merging (step 10). Candidate color pairs are preferably chosen by observing the following set of metrics:

(a) Color similarity: measure the color similarity between the two thread colors are by comparing their color values (step 12).

(b) Border length: Count the number of pixel pairs that straddle regions of the two thread colors (step 14). Note that the thread color regions need not be connected. (This is just like asking "how much border do the United States and Canada share?" Note that, in this analogy, the lower 48 States and Alaska both share a border with Canada even though they are not connected).

(c) Border strength: Look at all the pixels along the border and see whether they represent a true edge in the original image or an induced edge from the quantization (step 16). If the edge in the original image is sharp, then it has stronger edge strength. However, if the transition between the two colors is continuous (rather than sharp or abrupt) in the original image but sharp in the color-reduced image, then the edge was induced by the color-reduction process and the edge strength is classified as weaker. For example, consider an image of a red "X" on a white background with a soft gray drop shadow under it, as shown in FIG. 2A. When this image is quantized, as shown in FIG. 2B, it may end up with three thread colors: red, white, and gray (because the entire drop shadow snaps to gray). The border between the gray thread color and red thread color is strong in the original image, but the border between the gray thread color and the white thread color is induced (i.e., the edge between red/gray looks as sharp as the edge between gray/white in the color-reduced image (FIG. 2B), but the gray/white border in the original image is not really a sharp edge—the only reason it appears as a sharp edge in the color-reduced image of FIG. 2B is because the lighter gray pixels snapped to white and darker gray pixels snapped to gray). In this case, the merge of gray and white thread colors is prioritized before merging of gray/red or white/red because the edge between gray/white is not actually very sharp whereas the edge between gray/red and red/white is actually sharp in the original image of FIG. 2A. The border strength is measured between two thread color regions is measured by summing the color differences of all adjacent pixels that straddle the two color regions.

Every possible merge of two thread colors is ranked by a weighted combination of the above metrics (step 18). The weight afforded to each metric can be tuned for the typical images expected to be processed by the system. In an embodiment, the highest weight is given to the color similarity, followed by edge strength, and then edge length.

In an embodiment, the thread color pairs are ranked in terms of "cost to merge A into B", where A is one color thread value and B is another color thread value. In this embodiment, the cost for merging A into B=(weighted combination of border strength, border length, and color difference)*number of pixels in A. This embodiment also takes into account the number of pixels in A for the ranking. In this embodiment, the fewer pixels there are of assigned to color A, the lower the cost of the merge. To illustrate, referring again to the color-reduced image of the "X" in FIG. 2B, the cost of merging GRAY into WHITE is smaller than merging WHITE into GRAY because there are fewer GRAY pixels.

At least one color pair is selected for merger from the highest-ranking candidate color pairs and the selected color pair is merged into a single color in the color-reduced image (step 20). In an embodiment, the highest-ranking color pair is selected.

When merging a color pair into a single color, one or the other of the colors is selected and all pixels in the color-reduced image that have a color value of one of the colors in the color pair are set to the selected color. There are various ways to select which of the two colors in the pair shall rule out. For example, the color corresponding to the highest pixel count could be selected as the "merge-to" color. In the embodiment in which the rankings are based on the "cost to merge A into B", the highest ranking pair is the pair having the lowest cost to merge, and A is merged into B.

The method continues to iterate through the merging steps (steps 10-22) until the color-reduced image contains at most the predetermined maximum number of colors, $COLOR_{MAX}$ (as determined in step 8). The color-reduced image is then presented to the user (step 20) so that the user will understand how the color-reduction will affect the appearance of the embroidery design if embroidered.

In an embodiment, the predetermined maximum number of colors, $COLOR_{MAX}$, is a parameter that can be adjusted. The parameter can be set by the vendor based on the number of thread sources allowed by the embroidery machines being used to embroider products. In other embodiments, the user can select a number of colors (so long as it does not exceed the maximum number of thread sources of the embroidery machine) or other maximum thresholds set by the vendor. For example, a user may wish to view the embroidery design when reduced to alternative numbers of colors—for example, a 4-color image, a 5-color image, and a 6-color image. Then, based on the displayed 4-color, 5-color image, and 6-color images, the user may select the best-looking image to be used for conversion to the embroidery design.

FIG. 3 is a block diagram illustrating an exemplary system in which the invention may operate. As illustrated, a server 120 includes one or more processors 121, program memory 122 which stores computer-readable instructions for processing by the processor(s) 121, data memory 126 for storing data such as image(s) 105 received from customers operating client computer(s) 110, and communication hardware 125 for communicating with remote devices such as client computer (s) 110 over a network 101 such as the Internet. The program memory 122 includes program instructions implementing an image smoothing filter 123 and a color-reduction engine 123.

One or more client computer(s) 110 (only one shown) is conventionally equipped with one or more processors 112, computer storage memory 113, 114 for storing program instructions and data, respectively, and communication hardware 116 configured to connect the client computer 110 to the server 120 via the network 101. The client 110 includes a display 117 and input hardware 118 such as a keyboard, mouse, etc., and executes a browser 119 which allows the customer to navigate to a web site served by the server 120 and displays web pages 127 served from the server 120 on the display 117.

Memory 122, 126, 113, and 114 may be embodied in any one or more computer-readable storage media of one or more types, such as but not limited to RAM, ROM, hard disk drives, optical drives, disk arrays, CD-ROMs, floppy disks, memory sticks, etc. Memory 122, 126, 113, and 114 may include permanent storage, removable storage, and cache storage, and further may comprise one contiguous physical computer readable storage medium, or may be distributed across multiple physical computer readable storage media, which may include one or more different types of media. Data memory 126 stores web pages 127, typically in HTML or other web-language format to be served to client computers 110 and displayed in client browsers 119. Data memory 126 also includes a content database 129 that stores content such as various layouts, patterns designs, color schemes, font schemes and other information used by the server 120 to enable the creation and rendering of product templates and images. Co-owned U.S. Pat. No. 7,322,007 entitled "Electronic Document Modification", and U.S. Pat. Publication No. 2005/0075746 A1 entitled "Electronic Product Design", each describes a Web-based document editing system and method using separately selectable layouts, designs, color schemes, and font schemes, and each is hereby incorporated by reference in its entirety into this application.

Figure 4A:
FIGS. 4A-4H illustrate a series of example web pages that may be presented to a customer uploading an image to be converted to an embroidery design for embroidery on a product.
Figure 4B:
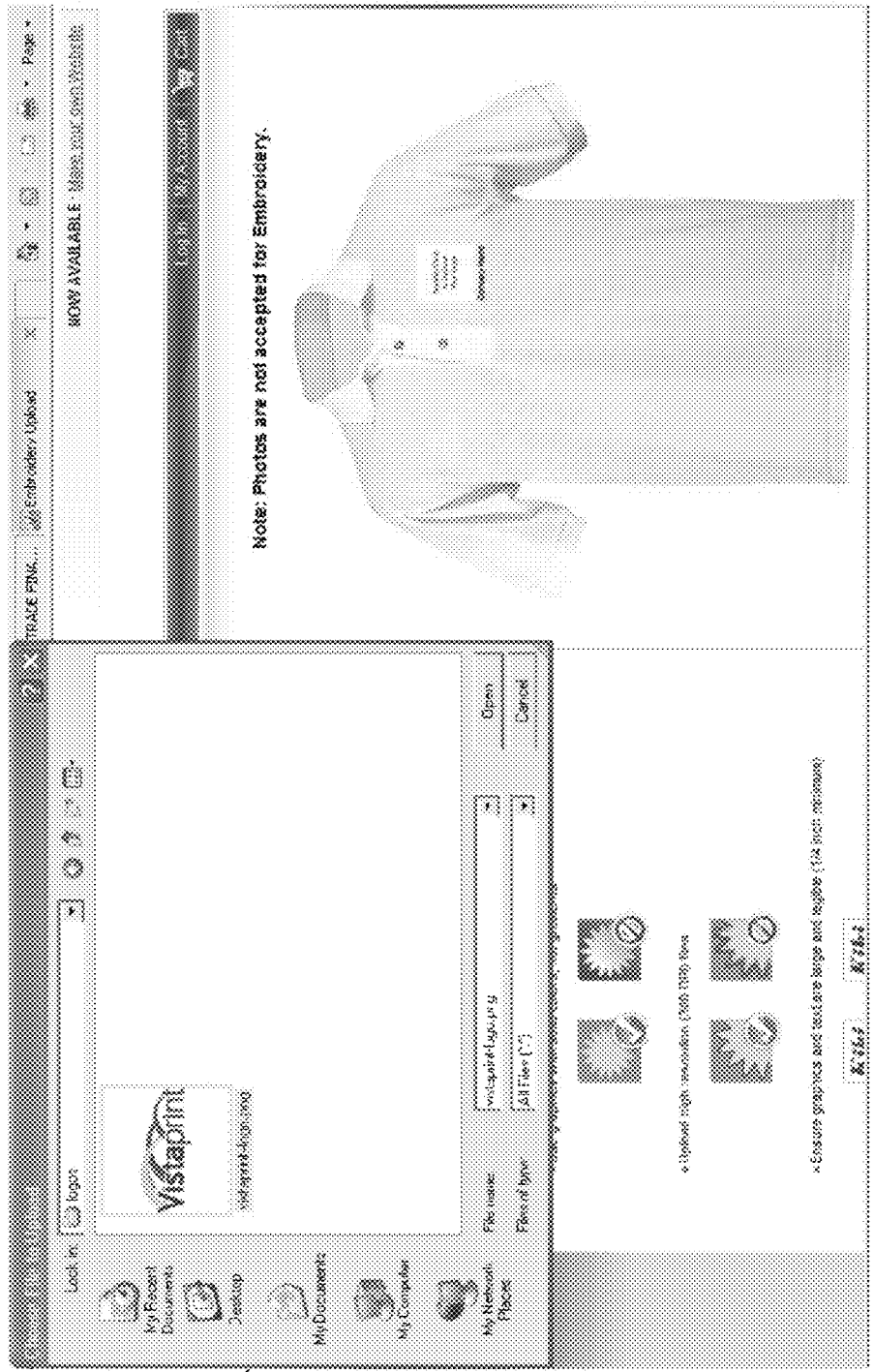
Figure 4C:
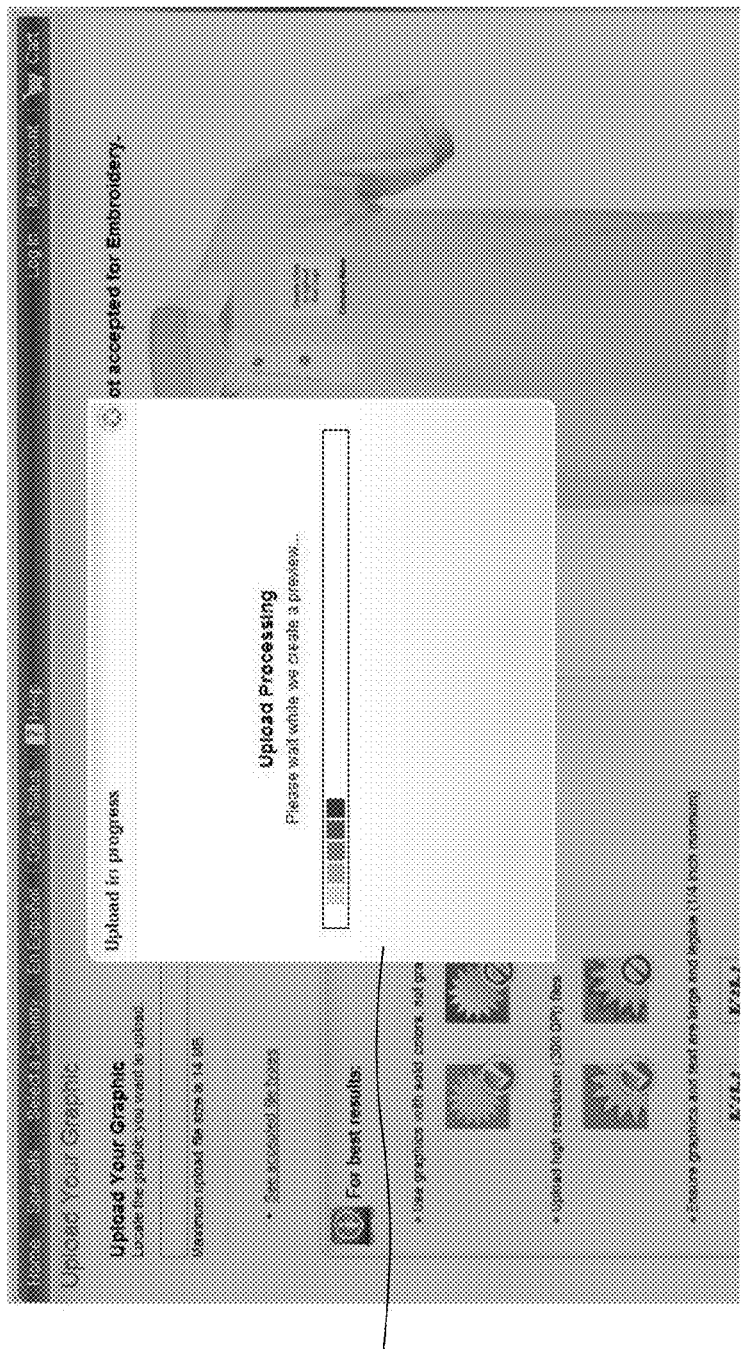

FIGS. 4A-4F show example web pages served by the server 120 hosting an online custom product web site. FIG. 4A shows a web page 40 inviting the customer to upload an image 105 to the server 120 to be used in the design of a customized embroidered product. In FIG. 4B, the customer has selected an image, "vistaprint-logo.png", for upload 41, and in FIG. 4C, the uploading is being processed 42.

Figure 4D:
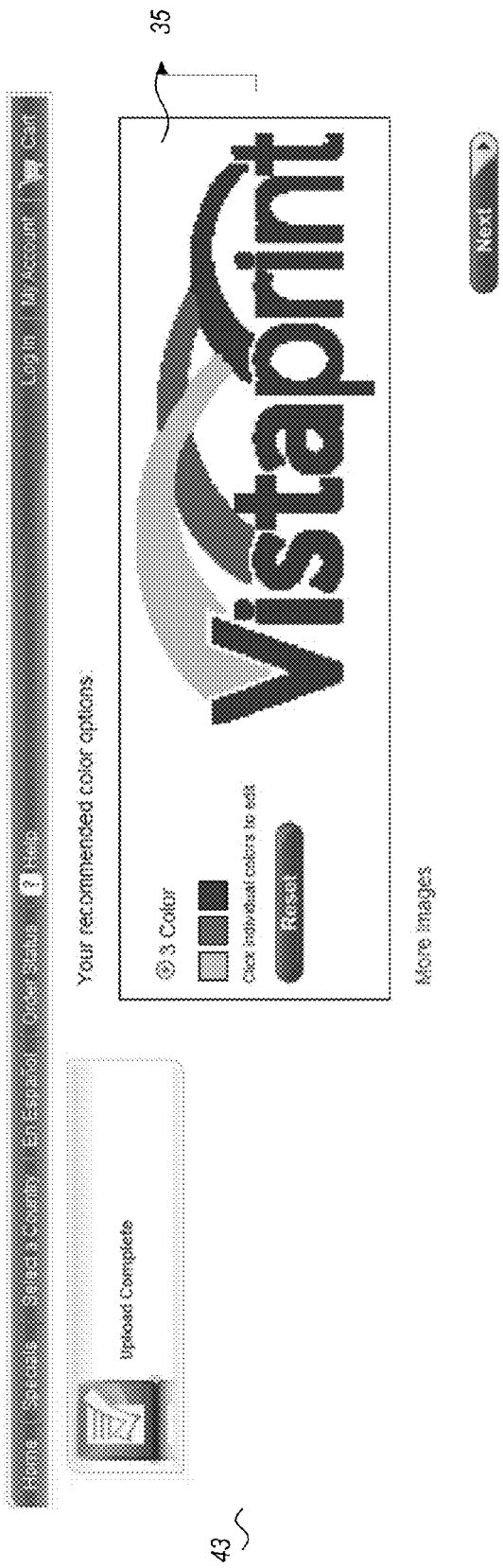

FIG. 4D shows a web page 43 after successful upload of the customer's image file, "vistaprint-logo.png". The image has been converted by the server into a preview 35 of a recommended color-reduced image based on the uploaded image. The preview image 35 depicts how the colors of the embroidered design will appear when converted to an embroidery design. In this example, the image of the "vistaprint-logo.png" has been reduced to three colors (not including WHITE) by the server, and the color-reduced image generated by the color-reduction engine 124 has been sent to the client browser and displayed in the preview container in the web page. In an embodiment, the color-reduced image is generated according to the method shown in, and described in connection with, FIG. 1. In an embodiment, the server 120 submits the filtered image (output by the smoothing filter 123) to the color-reduction engine 124 and sets the maximum number of colors, $COLORS_{MAX}$, to 3.

In an embodiment, prior to generating the color-reduced image, the server 120 submits the uploaded image 105 to the smoothing filter 123, the output of which is processed by the color-reduction engine 124 to reduce the image to colors optimal for embroidery based on a predetermined palette 128 of embroidery thread colors. The color-reduced image generated by the color-reduction engine 124 is then sent by the server 120 to the client browser 119 for display to the customer on the user's display 117.

Figure 4E:
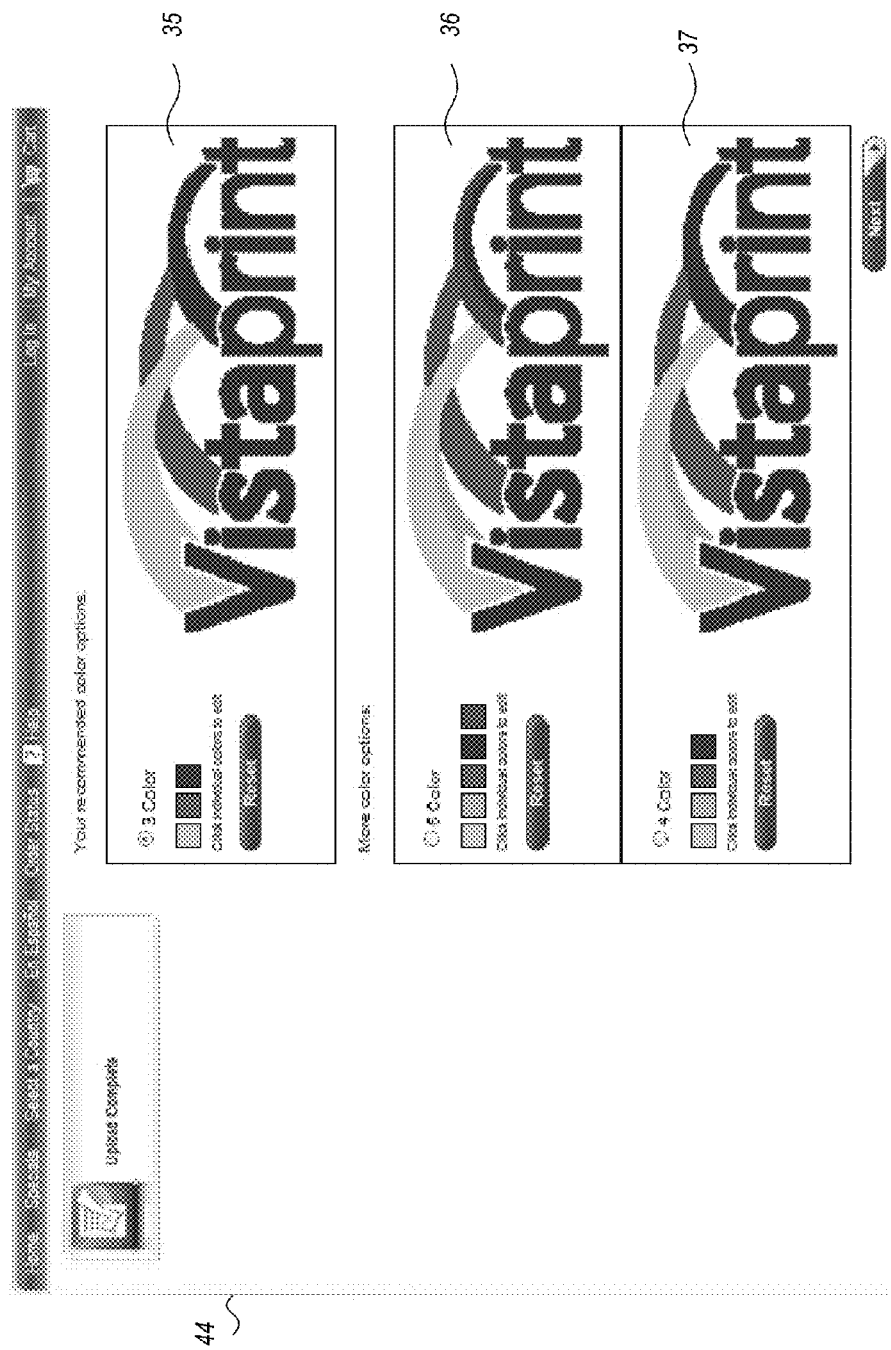

FIG. 4D includes a link, "More Images", that instructs the server to generate additional alternative color-reduced images. FIG. 4E shows an example web page 44 displayed to a user upon generation by the server 120 of two additional color-reduced images, including a 5-color image 36 and a 4-color image 37. In an embodiment, the server 120 resubmits the filtered image (output by the smoothing filter 123) to the color-reduction engine 124 but sets the maximum number of colors, $COLORS_{MAX}$, to 5 and 4, respectively.

In the illustrated embodiment, the alternative color-reduced images are generated by the changing the maximum number of colors, $COLORS_{MAX}$. In other embodiments, the alternative images may be generated by adjusting the weightings of the metrics in the ranking algorithm used by the color-reduction engine, the result of which may be that different color pairs are merged, resulting in a color-reduced image composed of a different set of embroidery thread colors than the image generated in the first pass.

The web page in the embodiment of FIG. 4D requires the user to request additional color-reduced image alternatives by clicking on the "More Images" hyperlink. This is done, for example, to reduce the processing time required by the server and the wait experienced by the user. In an embodiment, a default maximum number of colors, $COLORS_{MAX}$, may be preselected by the vendor. In an alternative embodiment, the user may be queried for a desired number of colors, $COLORS_{MAX}$, within a range of allowable numbers of colors. In such an embodiment, the user may enter a number in a textbox, select a link or button indicating the desired number, or use a slider to select the desired number of colors from a range of allowed numbers of colors (e.g., 1 to 16).

In other embodiments, the web page of FIG. 4D may be eliminated and multiple alternative color-reduced images are generated and displayed to the user as in FIG. 4E without requiring the user to request the additional images.

Figure 4F:
Figure 4G:
Figure 4H:
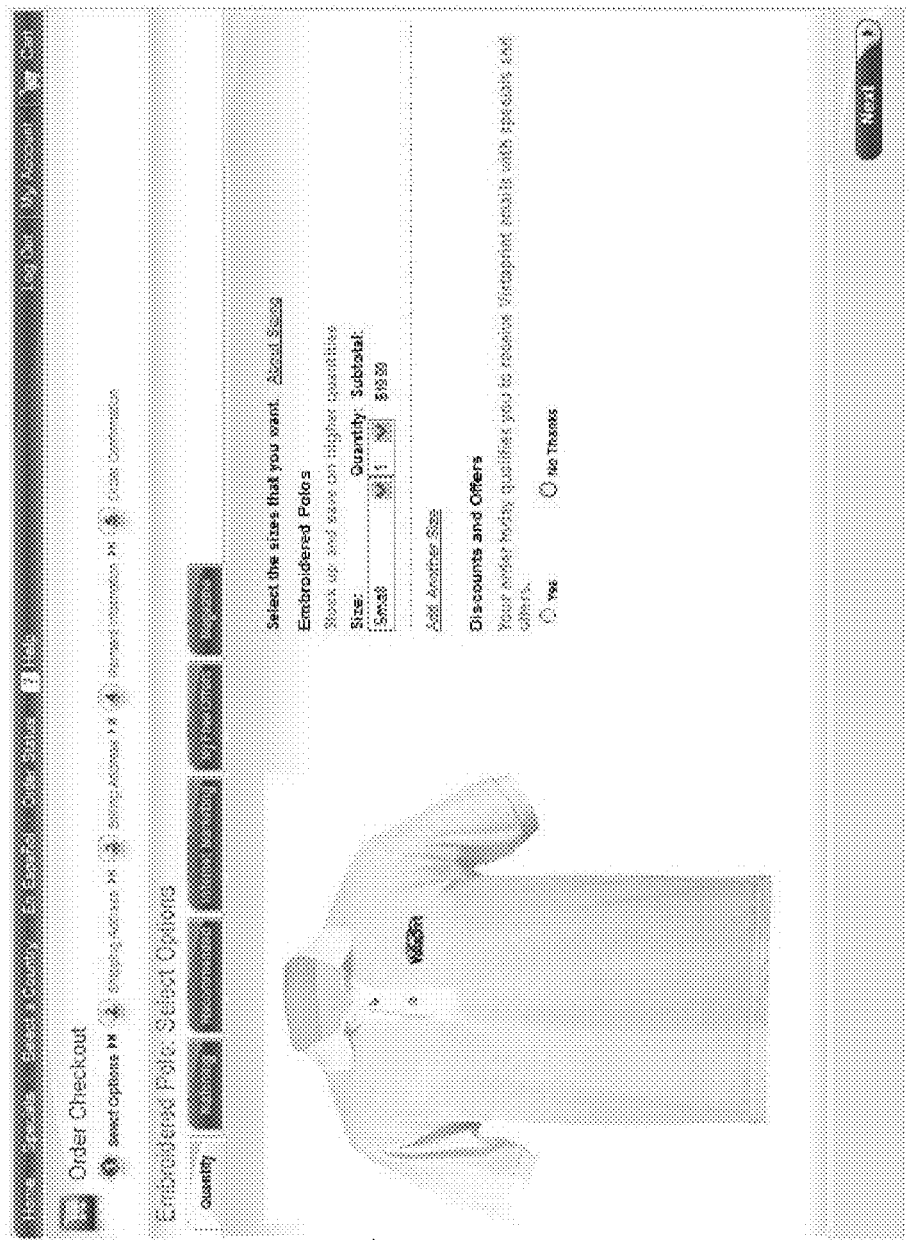

FIG. 4F shows the web page 45 of FIG. 4E after the user has selected the 5-color image. FIG. 4G shows an example web page 46 that may be presented to the user upon the user's clicking on the "Next" button in the web page of FIG. 4F. In this web page, the selected color-reduced image has been converted to a simulated embroidery design which is shown in a preview image container. In an embodiment, the color-reduced image is converted to an embroidery design according to the processes described in U.S. Pat. No. 6,836,695 to Goldman, and then a simulated embroidery design image is generated according to the processes described in U.S. patent application Ser. No. 12/911,521 to Hsu et al. The simulated embroidery design may also be shown affixed to a product, such as a polo shirt (in this example), in a preview product image. The user can indicate approval (e.g., by clicking on the "Next" link), and may then be presented with one or more web pages allowing the user to order products with an embroidered design based on the uploaded image and selected color-reduced image from the vendor. For example, FIG. 4H shows a web page 47 where the user can select the size of the polo shirt and number of shirts. Additional web pages (not shown) then lead the user through the ordering and payment process.

Turning now in more detail to the implementation of the system 100 shown in FIG. 3, the color-reduction engine 124 reduces the colors of an image to a reduced set of colors that map to embroidery thread colors. A digital image is composed of a 2-dimensional grid of pixels. For example, with reference to FIG. 5, a number of pixels is arranged in a rectangular grid. Each pixel is represented by its corresponding positional x- and y-coordinates in the grid. For example, an m×n pixel image would be represented as m rows and n columns, with pixel (0, 0) at the top left of the image, and pixel (m−1, n−1) at the bottom right of the image. The number of pixels in the image defines the resolution of the image, where high-resolution images have a higher density (and therefore number) of pixels than low-Docket resolution images. The specification of each pixel depends on the type of image (grayscale vs. color, the type of color model used, and the number of gray levels/colors). For example, in a grayscale image, each pixel may be represented by a single brightness value ranging from 0 (no brightness—i.e., completely dark) to 255 (full brightness—i.e., completely light). In a color image, each pixel may be represented by multiple values. For example, in an RGB color model, the color of each pixel is defined by a corresponding Red value (ranging from 0-255), a corresponding Green value (ranging from 0-255), and a corresponding Blue value (ranging from 0-255).

An embroidery vendor, an embroidery machine operator, or an embroidery designer may wish to generate an embroidery design based on an image such as a photograph or graphic. In more advanced applications, it may be desirable to allow a customer to upload an image to be converted to an embroidery design and embroidered on a product. For example, a customer may wish to have their company logo or customized text or even a photograph converted to an embroidery design and embroidered on a textile product such as a shirt or hat.

Figure 8A:
FIG. 8A shows a 24-bit color palette.
Figure 8B:
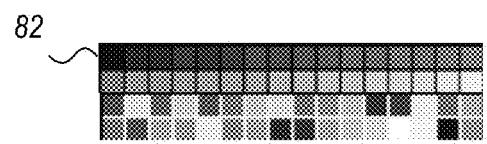
FIG. 8B shows a 48 embroidery thread color palette.

When an image is to be converted to an embroidery design, the colors of the image must be mapped to actual embroidery thread colors. Since embroidery machines typically allow only a limited number of thread colors (limited by the number of thread spools the machine holds), images having in excess of the maximum number of thread colors must be reduced to a number of colors equal to or less than the maximum number of thread colors. This process is known in the image processing art as "color reduction". During a color reduction process, all of the pixels in the image are classified and set to the nearest one of a reduced number of colors. If a given embroidery machine can embroider a design with up to 16 different colors (without having to change out threads), then a typical image having up to 16 million different colors (24 bits/pixel) will have to be reduced to an image having only 16 colors. This is illustrated in FIGS. 8A and 8B. FIG. 8A shows a 24-bit/pixel color palette 80 representing approximately 16 million different colors. FIG. 8B is an embroidery thread color palette 82, including 48 available thread colors, each of which must be an available embroidery thread color. Each square in palette 82 represents a different available thread color.

Color reduction can introduce new boundaries (edges) that were not visible in the original image. For example, referring to FIG. 6A, consider a region 21 of an image having a color that gradually changes across the region (e.g., from left to center and from center to right). Since the color transition is smooth and gradual, there are no visible edge features between the left, center, and right portions of the region 21. When color reduction is performed, however, as illustrated in FIG. 6B, the far left and far right portions 21a, 21c of the region 21 may be classified as a different color than the center portion 21b of the region. Pixels falling within the region 21 will be classified one way or another according to color range thresholds. Pixels at the far left 21a and far right 21c of the region 21 have a color value which falls within the range of a first color and are therefore classified as, and set to, the first color. Pixels closer to the center portion 21b of the region 21 have a color which falls within the range of a second color and are therefore classified as, and set to, the second color. The classification of all pixels in the region 21 into only two (or a small few) discrete colors therefore results in the fracturing of continuous color transitions into two or more discrete colored regions, introducing (i.e., inducing) new edges 22a, 22b that were not present in the original image.

Color reduction can also result in the elimination of original boundaries. For example, referring again to FIG. 6A, an image may have one or more regions 24, 25 of different colors, separated by distinct boundaries 26. The different colors of the regions 24 and 25, however, may each fall within a color range which maps to the same single color for purposes of color reduction. In this case, as shown in FIG. 6B, the sub-regions 24 and 25 are reduced to a single mono-color region 28, eliminating the original boundary 26 (see FIG. 6A) dividing them. Depending on how significant the eliminated feature was, this may or may not be acceptable in the final appearance of the embroidered image.

Returning to FIG. 3, prior to color-reduction, it is desirable to first filter the image in order to remove noise and smooth the image. The image smoothing filter 123 performs this process. In an embodiment, the image smoothing filter 123 implements a mean-shift algorithm. Mean shift algorithms are known in the art, for example as described in U.S. Pat. No. 6,590,999 to Comaniciu et al, hereby incorporated by reference for all that it teaches. Preferably, once the image is smoothed, it is processed by the color-reduction engine 124. In the embodiment described in detail in connection with FIG. 1, the color-reduction engine 124 (FIG. 3) processes each pixel and sets the color value of the pixel to the nearest embroidery thread color.

Figure 7A:
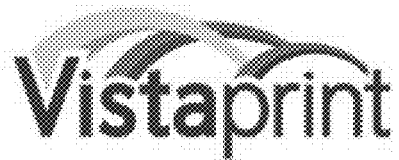
FIG. 7A shows an example original image.
Figure 7B:
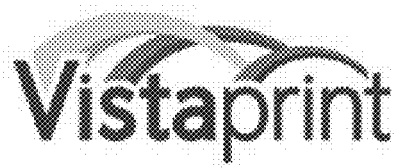
FIG. 7B shows a color-reduced image corresponding to the original image of FIG. 7A wherein the original colors are snapped to embroidery thread colors.

FIG. 7A shows an example original full-color image and FIG. 7B shows the filtered (i.e., smoothed) image after the initial color-reduction processing (i.e., after each pixel is color-snapped to the nearest embroidery thread color—for example, from the palette 82 in FIG. 8B). FIG. 5 shows a zoomed-in pixilated version of the image in FIG. 7B. As shown in FIGS. 5 and 7B, the color-snapped image contains seven different colors (including WHITE). For simplicity of explanation, let us assume that we can have a maximum of 4 colors (including WHITE) (with the understanding that in practice, the maximum number of allowed colors may actually be more than 6 colors (such as 16 colors)). The color-reduction engine then begins calculating merge costs for each possible pair of colors in the image.

The cost of merging A into B=$(w_1*(1/\text{color similarity between A and B})+w_2*(1/\text{border length between A and B})+w_3*(1/\text{edge strength between A and B}))*\#$ of A pixels, are the weights given to color similarity, border length, and edge strength, respectively.

For example, the image in FIG. 5 includes the following pairs of colors and their associated calculated metrics:

| A | B | Color Similarity | Border Length | Edge Strength | # A pixels | Merge Cost |
|---|---|---|---|---|---|---|
| WHITE | LIGHT BLUE | Low | Medium | 1 | | High |
| WHITE | YELLOW | Low | Medium | 1 | | High |
| WHITE | ORANGE | Low | Low | 1 | | High |
| WHITE | PINK | Low | Medium | 1 | | High |
| WHITE | RED | Low | Medium | 1 | | High |
| DARK BLUE | WHITE | Low | High | 1 | | High |
| DARK BLUE | LIGHT BLUE | High | Low | 1 | | High |
| DARK BLUE | YELLOW | Low | — | 1 | | High |
| DARK BLUE | ORANGE | Low | — | 1 | | High |
| DARK BLUE | PINK | Low | — | 1 | | High |
| DARK BLUE | RED | Low | — | 1 | | High |
| LIGHT BLUE | WHITE | Low | Medium | 1 | | Low |
| LIGHT BLUE | DARK BLUE | High | Medium | 1 | | Low |
| LIGHT BLUE | YELLOW | Low | Low | 1 | | Low |
| LIGHT BLUE | ORANGE | Low | — | 1 | | Low |
| LIGHT BLUE | PINK | Low | Low | 1 | | Low |
| LIGHT BLUE | RED | Low | Low | 1 | | Low |
| YELLOW | WHITE | Low | Medium | 1 | | Medium |
| YELLOW | DARK BLUE | Low | — | 1 | | Medium |
| YELLOW | LIGHT BLUE | Low | Low | 1 | | Medium |
| YELLOW | ORANGE | High | Low | 1 | | Medium |
| YELLOW | PINK | Medium | Low | 1 | | Medium |
| YELLOW | RED | Medium | Low | 1 | | Medium |
| ORANGE | WHITE | Low | Low | 1 | | Low |
| ORANGE | DARK BLUE | Low | — | 1 | | Low |
| ORANGE | LIGHT BLUE | Low | — | 1 | | Low |
| ORANGE | YELLOW | High | Low | 1 | | Low |
| ORANGE | PINK | Medium | — | 1 | | Low |
| ORANGE | RED | Medium | — | 1 | | Low |
| PINK | WHITE | Low | Medium | 1 | | Medium |
| PINK | DARK BLUE | Low | — | 1 | | Medium |
| PINK | LIGHT BLUE | Low | Low | 1 | | Medium |
| PINK | YELLOW | Medium | Low | 1 | | Medium |
| PINK | ORANGE | Medium | — | 1 | | Medium |
| PINK | RED | High | Medium | 1 | | Medium |
| RED | WHITE | Low | Medium | 1 | | Low |

| A | B | Color Similarity | Border Length | Edge Strength | # A pixels | Merge Cost | |
|---|---|---|---|---|---|---|---|
| RED | DARK BLUE | Low | — | 1 | Low | | |
| RED | LIGHT BLUE | Low | Low | 1 | Low | | |
| RED | YELLOW | Medium | Low | 1 | Low | | |
| RED | ORANGE | Medium | — | 1 | Low | | |
| RED | PINK | High | Medium | 1 | Low | Lowest | |

* Actual metric values are calculated in a real application.

In this simplified example, let us assume that that the edge strength is equally strong for all edges. Let us further assume that ORANGE is considered more similar to YELLOW than to any other color, RED is considered more similar to PINK than to any other color, and that LIGHT BLUE is considered more similar to DARK BLUE than to any other color. Further in this simplified example, and as illustrated in FIG. 5, the colors, arranged in order by fewest number of pixels to highest number of pixels, are as follows: ORANGE, LIGHT BLUE, RED, PINK, YELLOW, DARK BLUE, WHITE.

Figure 7C:
FIG. 7C shows the image of FIG. 7A color-reduced down to six colors according to the algorithm of FIG. 1.
Figure 7D:
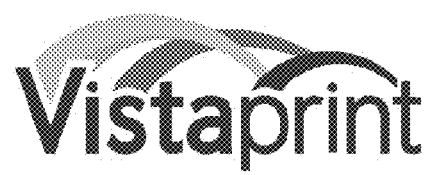
FIG. 7D shows the image of FIG. 7A color-reduced down to five colors according to the algorithm of FIG. 1.
Figure 7E:
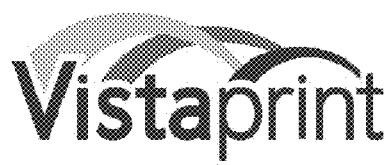
FIG. 7E shows the image of FIG. 7A color-reduced down to four colors according to the algorithm of FIG. 1.

In this example, the lowest cost merge is RED into PINK. All RED pixels are set to PINK, as illustrated in FIG. 7C, and the number of PINK pixels is increased by the number of (previously) RED pixels. The number of colors in the image is reduced from 7 (including WHITE) to 6. Since in this example the maximum number of colors, $COLORS_{MAX}$, is 5, the process is iterated to recalculate the merge costs. In the next iteration, LIGHT BLUE is merged into DARK BLUE, as illustrated in FIG. 7D, and we are down to 5 colors (including WHITE). In the next iteration, ORANGE is merged into YELLOW, as illustrated in FIG. 7E, and we are down to 4 colors (including WHITE). If the maximum number of colors, $COLORS_{MAX}$, were set to a lower number, for example three colors, the process would continue to iterate, merging color pairs identified as the lowest cost merge, until the image only contains the maximum number of colors, $COLORS_{MAX}$. Importantly, all colors in the color-reduced image are actual available embroidery thread colors.

In the current example, the original image contained only strong edges. Some images, such as the image shown in FIG. 2A, however, may contain fuzzy or more transitional borders. In these types of images, the color transitions gradually over multiple pixels from one color to another. For example, the shadow of the letter "X" in FIG. 2A transitions gradually from WHITE to GRAY. The edge strength of GRAY into WHITE pair would therefore be lower than the edge strength of GRAY into RED, and all other metrics being equal (which, of course, are not, in this example), would prioritize the merge of GRAY into WHITE over GRAY into RED. One technique for determining the strength of an edge or border is to compare the gradient of the color-reduced image to the gradient of the original image. If the gradients do not match, then the edge was induced by the color-reduction process and thus has a lower edge strength than an edge that existed in the original image.

To compute the border strength between two thread colors A and B, we take all pairs of adjacent pixels in the image and select the subset of adjacent pixels such that one pixel is labeled as thread color A and the other is labeled as thread color B. For each of these pixel pairs, compute the difference between their colors in the original image. The difference may be computed as a sum squared difference of their RGB color values. The sum of these differences is the border strength between thread colors A and B.

Those of skill in the art will appreciate that the invented method and apparatus described and illustrated herein may be implemented in software, firmware or hardware, or any suitable combination thereof. Preferably, the method and apparatus are implemented in software, for purposes of low cost and flexibility. Thus, those of skill in the art will appreciate that the method and apparatus of the invention may be implemented by a computer or microprocessor process in which instructions are executed, the instructions being stored for execution on a computer-readable medium and being executed by any suitable instruction processor. Alternative embodiments are contemplated, however, and are within the spirit and scope of the invention.

What is claimed is:

1. A method for converting an image comprising a total number of colors greater than a predetermined maximum color count to a color-reduced image, the method comprising the steps of:
   receiving, by one or more processors, an image comprising a plurality of pixels, wherein each pixel is characterized by an associated color value;
   generating, by one or more processors, a color-reduced image by setting the associated color value of each pixel in the image to a nearest color in a predetermined reduced set of colors;
   iteratively, until the total number of colors in the color-reduced image is not greater than the predetermined maximum color count, by one or more processors:
   identifying pairs of colors in the color-reduced image,
   selecting an identified color pair comprising a first color and a second color, the first color selected for merging into the second color, and
   setting the associated color value of all pixels in the color-reduced image characterized by an associated color value equal to the first color from the first color to the second color;
   wherein the selected identified color pair is selected based on color similarity and on edge characteristics of boundaries between regions in the color-reduced image comprising pixels characterized by the first color of the selected identified color pair and regions in the color-reduced image comprising pixels characterized by the second color of the selected identified color pair.

2. The method of claim 1, wherein the predetermined reduced set of colors corresponds to a set of available embroidery thread colors.

3. The method of claim 1, wherein the image is a photographic image.

4. The method of claim 1, wherein the selected identified color pair is selected further based on the number of pixels in at least one of the respective pair colors.

5. The method of claim 1, wherein the first color is selected for merging into the second color by:
   determining, by one or more processors, a level of similarity of the second color in the selected identified color pair;
   determining, by one or more processors, an edge strength of the boundaries between the regions in the color-reduced image comprising pixels characterized by the first color of the selected identified color pair and regions in the color-reduced image comprising pixels characterized by the second color of the selected identified color pair based on whether an existing edge in the color-reduced image existed as a hard edge in the received image; and selecting, by one or more processors, the first color to merge into the second color based on the determined level of similarity and determined edge strength.

6. The method of claim 5, wherein the selection of the first color for merging into the second color is further based on the number of pixels in at least one of the respective regions.

7. The method of claim 1, wherein the first color is selected for merging into the second color by:
   determining, by one or more processors, a level of similarity of the first color and the second color in the selected identified color pair;
   determining, by one or more processors, a border length between regions of the first color and regions of the second color in the color-reduced image; and
   selecting, by one or more processors, the first color to merge into the second color based on the determined level of similarity and determined border length.

8. The method of claim 7, wherein the selection of the first color for merging into the second color is further based on the number of pixels in at least one of the respective regions.

9. The method of claim 1, wherein the first color is selected for merging into the second color by:
   determining, by one or more processors, a level of similarity of the first color and the second color in the selected identified color pair;
   determining, by one or more processors, an edge strength of the boundaries between the regions in the color-reduced image comprising pixels characterized by the first color of the selected identified color pair and regions in the color-reduced image comprising pixels characterized by the second color of the selected identified color pair based on whether an existing edge in the color-reduced image existed as a hard edge in the received image;
   determining, by one or more processors, a border length between regions of the first color and regions of the second color in the color-reduced image; and
   selecting, by one or more processors, a first color to merge into a second color based on the determined level of similarity, determined edge strength, and determined border length.

10. The method of claim 9, wherein the selection of the first color for merging into the second color is further based on the number of pixels in at least one of the respective regions.

11. The method of claim 1, wherein the received image is supplied by a customer of an embroidered product, and the color-reduced image is presented to the customer on a computer display.

12. Non-transitory computer readable storage tangibly embodying program instructions which, when executed by a computer, implement a method for converting an image comprising a total number of colors greater than a predetermined maximum color count to a color-reduced image, the method comprising the steps of:
   receiving an image comprising a plurality of pixels, wherein each pixel is characterized by an associated color value;
   generating a color-reduced image by setting the associated color value of each pixel in the image to a nearest color in a predetermined reduced set of colors;
   iteratively, until the total number of colors in the color-reduced image is not greater than the predetermined maximum color count:
      identifying pairs of colors in the color-reduced image,
      selecting an identified color pair comprising a first color and a second color, the first color selected for merging into the second color, and
      setting the associated color value of all pixels in the color-reduced image characterized by an associated color value equal to the first color from the first color to the second color;
   wherein the selected identified color pair is selected based on color similarity and on edge characteristics of boundaries between regions in the color-reduced image comprising pixels characterized by the first color of the selected identified color pair and regions in the color-reduced image comprising pixels characterized by the second color of the selected identified color pair.

13. The non-transitory computer readable storage of claim 12, wherein the predetermined reduced set of colors corresponds to a set of available embroidery thread colors.

14. The non-transitory computer readable storage of claim 12, wherein the selected identified color pair is selected further based on the number of pixels in at least one of the respective pair colors.

15. The non-transitory computer readable storage of claim 12, wherein the first color is selected for merging into the second color by:
   determining a level of similarity of the first color and the second color in the selected identified color pair;
   determining an edge strength of the boundaries between the regions in the color-reduced image comprising pixels characterized by the first color of the selected identified color pair and regions in the color-reduced image comprising pixels characterized by the second color of the selected identified color pair based on whether an existing edge in the color-reduced image existed as a hard edge in the received image; and
   selecting the first color to merge into the second color based on the determined level of similarity and determined edge strength.

16. The non-transitory computer readable storage of claim 15, wherein the selected identified color pair is selected further based on the number of pixels in at least one of the respective pair colors.

17. The non-transitory computer readable storage of claim 12, wherein the first color is selected for merging into the second color by:
   determining a level of similarity of the first color and the second color in the selected identified color pair;
   determining a border length between regions of the first color and regions of the second color in the color-reduced image; and
   selecting the first color to merge into the second color based on the determined level of similarity and determined border length.

18. The non-transitory computer readable storage of claim 17, wherein the selected identified color pair is selected further based on the number of pixels in at least one of the respective pair colors.

19. The non-transitory computer readable storage of claim 12, wherein the first color is selected for merging into the second color by:
   determining a level of similarity of the first color and the second color in the selected identified color pair;
   determining an edge strength of the boundaries between the regions in the color-reduced image comprising pixels characterized by the first color of the selected identified color pair and regions in the color-reduced image comprising pixels characterized by the second color of the selected identified color pair based on whether an existing edge in the color-reduced image existed as a hard edge in the received image;

determining a border length between regions of the first color and regions of the second color in the color-reduced image; and selecting, by one or more processors, a first color to merge into a second color based on the determined level of similarity, determined edge strength, and determined border length.

20. The non-transitory computer readable storage of claim 19, wherein the selected identified color pair is selected further based on the number of pixels in at least one of the respective pair colors.

21. An apparatus for converting an image comprising a total number of colors greater than a predetermined maximum color count to a color-reduced image, comprising:
   computer readable memory storing an image comprising a plurality of pixels, wherein each pixel is characterized by an associated color value;
   one or more processors configured to generate a color-reduced image by setting the associated color value of each pixel in the image to a nearest color in a predetermined reduced set of colors;
   one or more processors configured to iteratively, until the total number of colors in the color-reduced image is not greater than the predetermined maximum color count:
      identify pairs of colors in the color-reduced image,
      select an identified color pair comprising a first color and a second color, and
      set the associated color value of all pixels in the color-reduced image characterized by an associated color value equal to the first color to the second color;
      wherein the selected identified color pair is selected based on color similarity and on edge characteristics of boundaries between regions in the color-reduced image comprising pixels characterized by the first color of the selected identified color pair and regions in the color-reduced image comprising pixels characterized by the second color of the selected identified color pair.

22. The apparatus of claim 21, wherein the predetermined reduced set of colors corresponds to a set of available embroidery thread colors.

23. The apparatus of claim 21, wherein the image is a photographic image.

24. The apparatus of claim 21, wherein the selected identified color pair is selected further based on the number of pixels in at least one of the respective pair colors of the corresponding selected color pair.

25. The apparatus of claim 21, comprising one or more processors configured to:
   determine a level of similarity of the first color and the second color in the selected identified color pair;
   determine an edge strength of the boundaries between the regions in the color-reduced image comprising pixels characterized by the first color of the selected identified color pair and regions in the color-reduced image comprising pixels characterized by the second color of the selected identified color pair based on whether an existing edge in the color-reduced image existed as a hard edge in the received image; and
   select the first color to merge into the second color based on the determined level of similarity and determined edge strength.

26. The apparatus of claim 25, wherein the selected identified color pair is selected further based on the number of pixels in at least one of the respective pair colors of the corresponding selected color pair.

27. The apparatus of claim 21, comprising one or more processors configured to:
   determine a level of similarity of the first color and the second color in the selected identified color pair;
   determine a border length between regions of the first color and regions of the second color in the color-reduced image; and
   select the first color to merge into the second color based on the determined level of similarity and determined border length.

28. The apparatus of claim 27, wherein the selected identified color pair is selected further based on the number of pixels in at least one of the respective pair colors of the corresponding selected color pair.

29. The apparatus of claim 21, comprising one or more processors configured to: determine a level of similarity of the first color and the second color in the selected identified color pair;
   determine an edge strength of the boundaries between the regions in the color-reduced image comprising pixels characterized by the first color of the selected identified color pair and regions in the color-reduced image comprising pixels characterized by the second color of the selected identified color pair based on whether an existing edge in the color-reduced image existed as a hard edge in the received image;
   determine a border length between regions of the first color and regions of the second color in the color-reduced image; and
   select the first color to merge into the second color based on the determined level of similarity, determined edge strength, and determined border length.

30. The apparatus of claim 29, wherein the selected identified color pair is selected further based on the number of pixels in at least one of the respective pair colors of the corresponding selected color pair.

31. The apparatus of claim 21, wherein the received image is supplied by a customer of an embroidered product, and the color-reduced image is presented to the customer on a computer display.

* * * * *